(12) United States Patent
Gerber et al.

(10) Patent No.: US 7,758,719 B2
(45) Date of Patent: Jul. 20, 2010

(54) WET PULPING SYSTEM AND METHOD FOR PRODUCING CELLULOSIC INSULATION WITH LOW ASH CONTENT

(75) Inventors: Steven A. Gerber, South Hill, VA (US); Eric M. Oganesoff, Potomac, MD (US); Milton L. Gerber, Cedarville, MI (US); Craig Stuart-Paul, Catonsville, MD (US)

(73) Assignee: Fiberight Management LLC, Catonsville, MD (US)

( * ) Notice: Subject to any disclaimer, the term of this patent is extended or adjusted under 35 U.S.C. 154(b) by 509 days.

(21) Appl. No.: 11/610,977

(22) Filed: Dec. 14, 2006

(65) Prior Publication Data

US 2007/0137805 A1 Jun. 21, 2007

Related U.S. Application Data

(60) Provisional application No. 60/750,788, filed on Dec. 16, 2005.

(51) Int. Cl.
*D21B 1/08* (2006.01)

(52) U.S. Cl. .................. 162/4; 162/5; 210/928

(58) Field of Classification Search .......... 210/928; 162/4, 5
See application file for complete search history.

(56) References Cited

U.S. PATENT DOCUMENTS

| | | | |
|---|---|---|---|
| 3,980,050 | A | 9/1976 | Neubauer |
| 4,283,275 | A | 8/1981 | Heinbockel et al. |
| 4,316,748 | A | 2/1982 | Rugg et al. |
| 4,440,635 | A | 4/1984 | Reiniger |
| 4,454,992 | A | 6/1984 | Draganov |
| 4,458,629 | A | 7/1984 | Gerber |
| 4,532,890 | A | 8/1985 | Ohki et al. |
| 4,591,412 | A * | 5/1986 | Hechler ................. 162/158 |
| 4,619,862 | A | 10/1986 | Sokolowski et al. |
| 4,737,238 | A | 4/1988 | de Ruvo |
| 4,760,717 | A | 8/1988 | Ponzielli |

(Continued)

FOREIGN PATENT DOCUMENTS

EP 1 627 950 6/2005

(Continued)

OTHER PUBLICATIONS

International Search Report for the corresponding international application PCT/US2006/047607 (3 pages).

(Continued)

*Primary Examiner*—Eric Hug
*Assistant Examiner*—Jacob Thomas Minskey
(74) *Attorney, Agent, or Firm*—Whiteford, Taylor & Preston L.L.P.; Gregory M. Stone

(57) ABSTRACT

Apparatus and method for recovering organic cellulosic fibers from landfill materials (such as post consumer, municipal and industrial waste materials). The apparatus and method selectively introduces waste materials containing organic cellulosic fibers into a size reduction machine. The pre-cleaned waste materials are conveyed to a tank, drum, or tunnel type fiber recovery apparatus. The waste materials are subjected to mechanical and fluid fiberization for a selected period of time to produce useful products, such as cellulosic insulation with a total ash content equal to or less than 10%, as well animal and fowl bedding products that is substantially devoid of moisture content, among other products.

4 Claims, 2 Drawing Sheets

U.S. PATENT DOCUMENTS

| | | | |
|---|---|---|---|
| 5,084,307 | A | 1/1992 | Nishimoto |
| 5,100,600 | A | 3/1992 | Keller et al. |
| 5,209,186 | A * | 5/1993 | Dewing ................. 119/172 |
| 5,272,852 | A | 12/1993 | Fortin et al. |
| 5,302,245 | A | 4/1994 | Nadeau |
| 5,352,780 | A | 10/1994 | Webb et al. |
| 5,582,685 | A * | 12/1996 | Vinson ................. 162/55 |
| 5,589,030 | A | 12/1996 | Sande et al. |
| 5,714,040 | A | 2/1998 | Poy et al. |
| 5,916,780 | A | 6/1999 | Foody et al. |
| 6,155,020 | A | 12/2000 | Deem |
| 6,238,516 | B1 | 5/2001 | Watson et al. |
| 6,386,144 | B1 | 5/2002 | Cathey |
| 6,419,788 | B1 | 7/2002 | Wingerson |
| 6,620,292 | B2 | 9/2003 | Wingerson |
| 7,263,934 | B2 | 9/2007 | Copeland et al. |
| 7,309,602 | B2 | 12/2007 | David |
| 2003/0037896 | A1 * | 2/2003 | Goulet et al. ............... 162/182 |
| 2004/0084366 | A1 * | 5/2004 | Anderson et al. ........... 210/603 |
| 2006/0011314 | A1 | 1/2006 | Hertl et al. |

FOREIGN PATENT DOCUMENTS

| | | |
|---|---|---|
| WO | WO 01/89702 | 11/2001 |

OTHER PUBLICATIONS

Written Opinion of the International Searching Authority for the corresponding international application PCT/US2006/047607 (9 pages).

European Search Report dated Feb. 4, 2010 in European Application No. EP 06 84 9955 (Application of Atlantic Recycling Technologies, LLC).

* cited by examiner

WET PULPING SYSTEM AND METHOD FOR PRODUCING CELLULOSIC INSULATION WITH LOW ASH CONTENT

PRIORITY

This application claims the benefit of priority under 35 U.S.C. §119(e) from U.S. Provisional Application Ser. No. 60/750,788, filed on Dec. 16, 2005, the entire contents of which are incorporated herein by reference.

BACKGROUND OF THE INVENTION

1. Field of the Invention

The present invention relates to systems and methods for recovering cellulosic fiber from waste products such as landfill materials, e.g., post-consumer, municipal, and industrial waste materials, and to systems and methods for removing and recovering adverse inorganic chemicals and materials from such products in order to produce cellulosic thermal insulation with certain performance and ash content characteristics, as well as to produce material used in fowl and animal bedding with certain desirable characteristics and filler materials for various organic and inorganic compositions.

2. Related Art

A widely used insulating material for homes and other buildings is commonly manufactured by fiberizing waste (primarily clean recycled newsprint; commonly referred to as "old newsprint" or "ONP") that has few contaminates (such as plastic, string, metal foil and glass), in suitable equipment (such as a hammer mill or a disc refiner), while adding dry fire retardant chemicals (such as boric acid and ammonium sulfate).

Cellulose insulation has been produced using a variety of manufacturing equipment for approximately 80 years. Methodology has only varied slightly over the years using a combination of paper shredders, hammer-mills with sizing screens and disc refiners to produce a market acceptable product.

The quality of cellulose insulation is defined technically as compliance with the industry standard ASTM C739. Products are labeled with testing results; normally from a third party testing facility, and certain components are tested regularly by manufacturers for quality assurance. The attributes traditionally tested in-house by manufacturers include two fire resistance tests; radiant panel and smoldering combustion, pH to confirm fire retardant chemical formulation and settled density.

Customers assume compliance with ASTM C739; however consider a quality product as one that provides the coverage per package that is advertised (product density and package weight), product texture or particle size, amount of contaminants and dust level.

Product coverage dictates the economic impact to the customer of using the product. The product density is an important indicator of a product's eventual coverage. A product's density is impacted by the fiber quality of the ONP, the condition of wear surfaces in the disc refiner and chemical content. Particle size is dictated by the condition of wear surfaces in the disc refiner and the gap settings within the refiner. Contaminants are a factor of the quality of the ONP and minimal process separation devices. Dust levels are dictated by the quality of ONP, wear surface condition in the disc refiner, chemical content and level of inorganic components from the ONP source.

In recent years it has become more difficult to obtain clean waste newsprint at acceptable prices in order to manufacture cellulosic insulation using the common dry manufacturing process mentioned above (which process is currently utilized by the entire U.S. cellulosic insulation market). There are numerous less expensive cellulosic fiber sources available today that all have non-desirable compositions or are mixed with non-desirable materials that cannot be used to manufacture cellulosic insulation utilizing the traditional dry production process to produce cellulosic insulation that meets Federal Specification requirements (including those by the U.S. Consumer Product Safety Commission and Federal Specifications such as ASTM C739-91, ASTM C739-03, ASTM E970, ASTM C518, ASTM C1148, ASTM D778 and HH-I-515D). In addition, the cost of clean dry waste newsprint has risen to levels that make it difficult to economically and competitively manufacture acceptable cellulosic insulation. This is due to the increase in demand for clean recycled newsprint, primarily from Asia.

Modern conventional processes require the use of #8 or #9 old newspapers (ONP) that are considered a high grade of recycled fiber. The entire process requires the use of dry ONP that has minimal contaminants (plastic, metal waste, etc). ONP is metered through a primary shredder, through a secondary hammer-mill and then a disc refiner to create the finished product. Fire retardant chemicals are metered through a pulverizer and added to the process normally before the disc refiner.

The most significant challenge facing conventional processes is the quality and composition of ONP. Papermaking technology has advanced to using recycled ONP as the primary source of fiber rather than virgin sources (trees). The addition of various fillers (primarily calcium carbonate; $CaCO_3$) has caused difficulty for cellulose insulation manufacturers to maintain good (lower) densities and a low-dust level product. The measurement of a product's thermal performance (R-value) is hindered by high densities and high levels of inorganic particles. Additionally, the advent of single-stream recycling programs has significantly reduced the availability of high quality ONP, one that is virtually free of contaminants and is dry.

Attempts to utilize a wet process to separate cellulosic fibers from contaminates found with or adhering to the cellulosic fibers have been made in the past. The common approach has been to utilize a standard hydro-pulping device to separate the cellulosic fibers from the contaminates, utilizing a harsh mechanical process that also degrades the fibers and leaves the contaminates in very small pieces that are difficult or impossible to remove. This method has not proven to be successful commercially to produce a cellulose based fiber insulation.

There are many types of waste materials that contain cellulosic fibers that cannot be recycled in conventional processes and are sent to landfills because the fibers are either (i) laminated and contain layers of plastic or metal foil (such as milk cartons and industrial scrap from aluminum roll boxes), and/or (ii) mixed with plastics, metal and/or glass to such a degree that it cannot be used. In addition, current papermaking research is directed to increasing the calcium carbonate loading, from approximately 5 to 7%, to a much higher 15 to 20% loading by reacting in situ calcium carbonate not only on the surface of the fibers but also in the hollow spaces within the fibers.

Paper manufacturers continue to increase the use of calcium carbonate as a major component in their papermaking processes to facilitate the use of greater amounts of shorter recycled fibers and thereby retain the desired sheet strength and other desirable physical properties. It should be noted that typical waste paper recycling processes, by design, retain these fillers as a necessary component to retain the physical properties of recycled paper stock. However, it is desirable to remove these fillers in order to produce acceptable products for uses other than the recycling of waste paper back into reconstituted (recycled) paper stock. Current levels of calcium carbonate and other fillers along with the increasing use of short fibers (fines) in the recycled waste paper stream is presenting a major problem for dry process cellulosic insulation manufacturers today. Products increasingly have a higher nuisance dust content, have higher bulk densities, and lower heat loss resistance values.

In order for a quality cellulosic thermal insulation to be manufactured with today's recoverable waste paper and fiber sources, the greater portion of the calcium carbonate's and other fillers should be removed, for example, by dissolving the calcium carbonate from within and on the fiber surfaces, and then precipitate and remove this contaminant and other fillers. The manufacture of quality cellulosic thermal insulation will become increasingly more difficult using the processes and technologies that are available today.

There have been several attempts to produce cellulosic insulation from waste fibers using systems that utilize a combination of wet and dry process steps. For example, U.S. Pat. No. 6,155,020, to Deem, issued Dec. 5, 2000, discloses a method for producing insulation out of recycled carpet utilizing a dry shredding process to separate the useful fibers from the carpet backing and other non-used materials.

U.S. Pat. No. 5,714,040, to Poy et al., issued Feb. 3, 1998, discloses a method for recovering fiber from printed newspaper by loading the waste paper and water into a continuous batch fiber recovery apparatus. All are agitated within the apparatus to form a pulp fiber slurry while introducing de-inking and agglomerating compositions to causes ink particles associated with the printed newspaper to separate. These ink particles are then removed from the pulp using separation techniques.

U.S. Pat. No. 5,272,852, to Fortin et al., issued Dec. 28, 1993, discloses a process where an insulating pulp is formed from debarked trees, primarily black spruce, using a chemi-thermo-mechanical pulping process to make a fluffed form or to form a compressed sheet that is later defiberized utilizing a portable insulating pulp applicator. The resulting product has a fire retardant additive in the range of 10%-25% by weight.

U.S. Pat. No. 5,084,307, to Nishimoto et al., issued Jan. 28, 1992, discloses a flame retardant vegetable fiber material and a process for the production of this material. Vegetable fiber is immersed into two inorganic solutions to fill the inherent gaps of the fiber to create an insoluble and incombustible inorganic compound that can be used as a fire retardant material such as asbestos or rock wool. The inorganic solutions utilized include first, magnesium chloride, barium chloride, calcium carbonate, aluminum chloride, aluminum borate and aluminum sulfate and second, ammonium sulfate, ammonium pyrophosphate, ammonium magnesia and boric acid soda.

U.S. Pat. No. 4,454,992, to Draganov, issued Jun. 19, 1984, discloses a combination wet/dry system that utilizes an aqueous solution of non-hydroscopic fire retardants to produce cellulosic insulation. The process described uses a predominately dry process to grind shredded newsprint and add fire retardant chemicals in a wet form with elevated temperature to utilize a low amount of fire retardant chemicals to meet commercial fire retardancy requirements.

There also have been attempts to produce non-insulation products from waste fibers that focus on separating the fibers from non-fibrous materials. For example, U.S. Pat. No. 4,737, 238, to de Ruvo, et al., issued Apr. 12, 1988, discloses a process for treating waste paper containing aluminum and having high lignin content by de-lignifying and pulping the waste paper for reuse in papermaking.

U.S. Pat. No. 4,760,717, to Ponzielli, issued Aug. 2, 1998, discloses a process that uses a hydro-pulping like apparatus to separate plastic film from cellulosic fibers goods. This process acts like a blender to shred the materials during processing.

U.S. Pat. No. 6,238,516, to Watson et al., issued May 29, 2001, discloses a system and process whereby pulping machines are utilized to recycle plastic and cellulosic fibers from disposed diapers. The process utilizes a similar fiber recovery apparatus to separate the plastic from the cellulosic fibers, then clean the plastic and cellulosic fibers from all waste material for further use.

Despite these known approaches, and the increasing need for quality waste products, no commercial process has been developed to produce cellulosic insulation out of waste paper materials that are contaminated with a high degree of calcium carbonate, fines, and other non-organic materials (such as plastics, foils, glass, metal and other non-organic content), and materials that are contained in, commingled with, or laminated to the cellulosic fibers or waste fibers. These waste materials are currently sent to a landfill and landfills are becoming increasingly scarce and difficult to build.

In regard to animal and fowl bedding materials, conventional paper-based bedding frequently contains contaminants that are a result of poor quality old newspapers. Since the animals frequently ingest the bedding, some of these contaminants can cause illness and therefore growth issues with the animals. Mold and bacteria are a significant problem with conventional wood shavings or sawdust. These also are supplied with widely varying levels of moisture.

Conventional paper-based bedding has previously been supplied either as chips of paper or as fiber. These tend to not be as absorbent and compact tightly minimizing the thermal advantages. Customers will endeavor to reconstitute or fluff up their bedding to allow it to dry and gain additional life from the bedding. Conventional paper-based bedding is produced in a dry process using various shredders and hammer-mills, thus making the addition of additives that adequately adhere to the fibers difficult or inefficient.

Conventional paper-based bedding is produced using ONP and other common recycled paper based products. Conventional processes do not have the capability of managing and therefore reducing the inorganic components of the raw material. Inorganic particles add to the dust level of the finished product, add no absorption qualities and aid in the compaction issues inherent with paper-based bedding.

There are several purposes for providing animal and fowl bedding: animal and fowl bedding absorbs excess moisture from the droppings and drinkers and promotes drying by increasing the surface area of the house floor; animal and fowl bedding dilutes fecal material, thus reducing contact between birds and manure; and in the poultry industry, animal and fowl bedding insulates chicks from the cooling effects of the ground and provides a protective cushion between the birds and the floor.

An effective bedding material must be absorbent, lightweight, inexpensive and non-toxic. Ideal materials will have high moisture absorption and release qualities to minimize litter caking. In addition, a bedding material must be compatible as a fertilizer or soil amendment or for incineration after it has served its purpose in the poultry house.

Excess moisture in the litter increases the incidence of breast blisters, skin burns, scabby areas, bruising, condemnations and downgrades. The wetter the litter, the more likely it will promote the proliferation of pathogenic bacteria and molds. Wet litter is also the primary cause of ammonia emissions, one of the most serious performance and environmental factors affecting broiler production today. Controlling litter moisture is the most important step in avoiding ammonia problems.

Conventional animal and fowl bedding products have significant disadvantages, as Table I indicates:

TABLE I

Advantages and Disadvantages of Various Animal and Fowl Bedding Materials

| | |
|---|---|
| Pine shavings and sawdust | Preferred litter material but becoming limited in supply and expensive in areas. |
| Hardwood shavings and sawdust | Often high in moisture and susceptible to dangerous mold growth if stored improperly prior to use. |
| Pine or hardwood chips | Used successfully but may cause increased incidence of breast blisters if allowed to become too wet. |
| Pine or hardwood bark | Similar to chips or shavings in moisture absorption capacity. Medium-sized particles preferred. |
| Rice hulls | A good litter material where available at a competitive price. Young chicks may be prone to litter eating (not a serious problem). |
| Peanut hulls | An inexpensive litter material in peanut-producing areas. Tends to cake and crust but can be managed. Susceptible to mold growth and increased incidence of aspergillosis. Some problems with pesticides have been noted in the past. |
| Sand | Field trials show comparable performance to pine shavings. Long-term reuse potential with de-caking. More difficult to maintain suitable floor temperatures during cold weather brooding. Need ample time and ventilation prior to brooding to assure dryness. |
| Crushed corn cobs | Limited availability. May be associated with increased breast blisters. |
| Chopped straw, hay or corn stover | Considerable tendency toward caking. Mold growth can also be a disadvantage. |
| Processed paper | Various forms of processed paper have proven to be good litter material in research and commercial situations. Tendency to cake with increased particle size. Top dressing paper base with shavings may minimize this problem. |

Despite these known animal and fowl bedding products, and the increasing need for a high quality, inexpensive and widely available product, limited commercial products or processes have been developed to meet the needs of private and commercial animal owners for animal and fowl bedding. These needs include: (a) a higher degree of absorbency than sawdust, straw or wood shavings; (b) a higher degree of absorbency than conventional paper-based bedding; (c) a consistently manufactured product; (d) a uniform particle size and composition; (e) a product that maintains its uniform particle size and composition without severe compaction; (f) improved thermal qualities; and (g) relatively quick decomposition following disposal. Furthermore, consumer and commercial users of animal and fowl bedding would greatly appreciate animal and fowl bedding that is virtually free from contamination, can be custom manufactured to include performance enhancers, is delivered with consistent moisture content levels, that can be purchased in packages that are relatively clean and easy to store, and which can be used for biomass power generation in a manner that is safe for the environment.

SUMMARY OF THE INVENTION

In one aspect of the present invention, a cellulosic thermal insulation composition is provided with selective inorganic contents resulting in a selective final product ash content. In another aspect of the present invention, a composition is provided that is produced in a wet pulping process using non-traditional raw materials (such as beater dye, materials recycling facility (MRF) residual, fibers laminated with plastic and/or metal foil, pulp sludge, wet cellulosic fibers, industrial waste, mixed waste, post-consumer mixed recyclables, mixed office waste, post-consumer industrial fiber waste, and other commercial waste).

In another aspect of the present invention, a system and a method are provided for manufacturing commercially saleable cellulosic insulation from non-traditional raw materials (such as beater dye, MRF residual, fibers laminated with plastic and/or metal foil, pulp sludge, wet cellulosic fibers, industrial waste, mixed waste, post-consumer mixed recyclables, mixed office waste, post-consumer industrial fiber waste, and other commercial waste) without utilizing a process to substantially pre-separate and dispose of any contaminates.

In a further aspect of the present invention, a system and method are provided to process raw materials containing cellulosic fibers with high levels of inorganic chemicals such that the amount of inorganic materials contained in the processed material falls below a specific ash content that provides for a commercially saleable cellulosic insulation.

In a further aspect of the present invention, a method is provided for processing previously un-processable materials in a conventional hydro pulper (such materials as beater dye, MRF residual, fibers laminated with plastic and/or metal foil, pulp sludge, wet cellulosic fibers, industrial waste, mixed waste, post-consumer mixed recyclables, mixed office waste, post-consumer industrial fiber waste, and other commercial waste that are currently being sent to a landfill for disposal).

Still another aspect of the present invention is to provide a method for processing previously un-processable materials (such as beater dye, MRF residual, fibers laminated with plastic and/or metal foil, pulp sludge, wet cellulosic fibers, industrial waste, mixed waste, post-consumer mixed recyclables, mixed office waste, post-consumer industrial fiber waste and other commercial waste that are currently being sent to a landfill for disposal) whereby the fiber recovery process releases fines, clays, calcium carbonate, and other non-organic material into a pulping fluid, which is then referred to as dirty water. The pulping fluid is preferably further processed through one or more clarifiers with select solids separation reagents to selectively remove excess fines, clays, calcium carbonate, and other inorganic materials that are detrimental to producing cellulosic insulation with a total ash content equal to or less than 10%, that meets the commercial product requirements listed herein.

Still another aspect of the present invention is to recover commercially viable compounds (such as aluminum hydroxide, magnesium hydroxide, and calcium carbonate) in order to reduce the overall cost of the fiber recovery process.

Preferably, a method according to one embodiment of the present invention processes commingled materials (such as beater dye, MRF residual, fibers laminated with plastic and/or metal foil, pulp sludge, wet cellulosic fibers, industrial waste, mixed waste, post-consumer mixed recyclables, mixed office waste, post-consumer industrial fiber waste, and other commingled waste). These materials are first deposited into a fiber recovery apparatus such as a tunnel washer or a hydro-pulper, where the commingled materials are washed in a pulping fluid that includes water, fire retardant chemicals, dyes, insecticides, biocides, surfactants, decay inhibitors, and polymers. The disposed materials are preferably agitated in the first two zones of the fiber recovery apparatus, so as to separate the cellulosic fibers from the non-cellulosic material (which includes plastic, metal foil, and fillers such as calcium carbonate and clay, and other contaminates). Preferably, the cellulosic material and large containments are then transferred to a third fiber recovery apparatus where the cellulosic fibers are filtered out and away from the non-cellulosic fibers with the process liquor, for further processing. Preferably, the non-cellulosic materials are then scooped out of the end of the third zone of the fiber recovery apparatus and disposed of. The dirtied pulping fluid is further processed through one or more clarifiers with select solids separation reagents and polymers to selectively remove fines, clays, calcium carbonate and other non-organic material, and then returned to the pulping fluid that is preferably in a closed loop system. The cellulosic fibers are preferably further processed through a series of presses to remove excess water and pulping fluid, disc refiner(s) to fluff the fibers, a dryer(s), and a packaging machine.

Another aspect of the present invention is to provide a cellulosic thermal insulation which is formed from the materials through the preferred wet pulping process described herein, with a inorganic or total ash content equal to or less than 10% including the fire retardant chemicals.

Accordingly, the above described disadvantages are overcome and a number of advantages are realized by a first aspect of the present invention which relates to a process for recovering organic cellulosic fibers from landfill materials such as post consumer, municipal and industrial waste materials comprising: a. selectively introducing waste materials containing organic cellulosic fibers into a size reduction machine; b. conveying such pre-cleaned waste material to a tank, drum or tunnel type fiber recovery apparatus; and c. subjecting such waste material for a selected period of time to mechanical and fluid fiberization. The method of first aspect of the present invention further comprises: d. introducing a pulping fluid containing chemicals to enhance the fiber separation process; e. selectively treating the recovered fibers with rapidly penetrating flame retardants, insecticidal properties and decay inhibitors; f. selectively dyeing the separated fibers to selected colors; and, g. providing solids separation reagents to selectively remove contaminants in the pulping fluids. In the first aspect of the present invention, the pulping fluid is selectively heated to a temperature range between about 50° F. to about 200° F.

The method of first aspect of the present invention further comprises: h. cleaning the recovered fibers through screening and hydro-cleaning devices to remove plastics and tramp metal; i. conveying the removed plastics and tramp metals to a waste disposal system consisting of a receiving tank and a sludge press; j. extracting a high percentage of the pulping fluid for further processing; k. subjecting the recovered fibers to a mechanical disk refiner to control fiber length, fiber bundle separation and fiber surface properties; l. removing contaminants consisting of fillers, fines, coatings and other extraneous materials through the use of one or more clarifiers with select solids separation reagents and polymers; m. extracting pulping fluids and water from the recovered fibers to formulate a cellulosic fiber wet lap of about 40% to about 60% pulp solids content; n. fluffing the cellulosic fiber wet lap in a cake fluffer and a disk refiner; and o. drying the fluffed fibers in a flash or tunnel dryer; and p. conveying the dried fibers to a packaging or baling system.

According to the first aspect of the present invention, the step of drying comprises: drying the fluffed fibers at a temperature from about 150 F to about 700° F., thereby reducing bacteria content of the recovered fibers, and drying them to a uniform moisture content, and wherein the uniform moisture content is between about 10% and about 18%. According to the first aspect of the present invention, the dried fibers have a bulk density of between about 2 pounds per cubic foot to about 6 pounds per cubic foot, and the dried fibers are used for animal and fowl bedding and have a higher degree of absorbency than sawdust, straw, wood shaving, or conventional paper-based bedding, and further wherein the dried fibers used for animal and fowl bedding are about six times more absorbent than sawdust, straw or wood shavings. Still further according to the first aspect of the present invention, the dried fibers used for animal and fowl bedding are between about 18% to about 25% more absorbent than conventional paper-based bedding, and incur between about 40% to about 50% less compaction than conventional paper-based animal and fowl bedding.

According to the first aspect of the present invention, the process further comprises: q. removing inorganic precipitated chemicals and contaminants from the extracted pulping fluids; and r. recycling the pulping fluids back to the primary tank/drum/tunnel fiber recovery apparatus. According to the first aspect of the present invention, the removed inorganic precipitated chemicals and selected contaminants comprise calcium hydroxide, calcium carbonate calcites, aluminum hydroxide, aluminum oxide, magnesium hydroxide and/or various other minor hydroxides. Still further according to the first aspect of the present invention, the recovered organic cellulosic fibers comprise a final total ash content equal to or less than about 10%. According to the first aspect of the present invention, the recovered organic cellulosic fibers comprise a final total ash content of about 8.09%, and wherein the recovered organic cellulosic fibers comprise an average fiber length greater than about 0.700 mm. According to the first aspect of the present invention, the recovered organic cellulosic fibers comprise an average fiber length of about 0.780 mm.

A second aspect of the present invention is provided that relates to a cellulosic insulating fiber product that is used for thermal insulation in applications ranging from about −50° F. to about +170° F., wherein the composition of the fiber product has a bulk density of about 1.0 pounds per cubic foot, to about 1.6 pounds per cubic foot, the composition of the fiber product is substantially free of dust particles, and wherein the composition of the fiber product has a final total ash content equal to or less than about 10%.

According to the second aspect of the present invention, the final total ash content is less than about 9%. According to the second aspect of the present invention, the final total ash content is about 8.09%, and wherein the fiber product is selectively dyed to provide brand identification. According to the second aspect of the present invention, the fiber product is used as acoustical insulation, packaging materials, industrial thickeners or fillers to be combined with other products, hydro-mulch and other related uses.

According to a third aspect of the present invention, a cellulosic animal and fowl bedding fiber product is provided that is used for the absorption of excess moisture, fecal matter and thermal insulation in animal applications, wherein the composition of the cellulosic animal and fowl bedding fiber product has a bulk density of about 2.0 pounds per cubic foot to about 6.0 pounds per cubic foot, the composition of the cellulosic animal and fowl bedding fiber product is substantially free of dust particles, and wherein the composition of the cellulosic animal and fowl bedding fiber product has a final total ash content equal to or less than about 10%. According to the third aspect of the present invention, the ash content is less than about 9%. According to the third aspect of the present invention, the ash content is about 8.09%, and the fiber product is selectively dyed to provide brand identification.

According to the third aspect of the present invention, the fiber product has a higher absorbency than wood shavings, sawdust or straw and conventional paper-based litter, and the fiber product reduces foot sores in poultry products in comparison to wood based bedding. Still further according to the third aspect of the present invention, fiber product is used for animal and fowl bedding and incurs between about 40% to about 50% less compaction than conventional paper-based animal and fowl bedding.

According to a fourth aspect of the present invention, a system for recovering organic cellulosic fibers from landfill materials such as post consumer, municipal and industrial waste materials is provided comprising: a. means for selectively introducing waste materials containing organic cellulosic fibers into a size reduction machine; b. means for conveying such pre-cleaned waste material to a tank, drum or tunnel type fiber recovery apparatus; and c. means for subjecting such waste material for a selected period of time to mechanical and fluid fiberization. The system according to the fourth aspect of the present invention further comprises: d. means for introducing a pulping fluid containing chemicals to enhance the fiber separation process; e. means for selectively treating the recovered fibers with rapidly penetrating flame retardants, insecticidal properties and decay inhibitors; f. means for selectively dyeing the separated fibers to selected colors; and, g. means for providing solids separation reagents to selectively remove contaminants in the pulping fluids. According to the fourth aspect of the present invention, the pulping fluid is selectively heated to a temperature range between about 50° F. to about 200° F., and the system further comprises: h. means for cleaning the recovered fibers through screening and hydro-cleaning devices to remove plastics and tramp metal; i. means for conveying the removed plastics and tramp metals to a waste disposal system consisting of a receiving tank and a sludge press; and j. means for extracting a high percentage of the pulping fluid for further processing.

According to the fourth aspect of the present invention, the system still further comprises k. means for subjecting the recovered fibers to a mechanical disk refiner to control fiber length, fiber bundle separation and fiber surface properties; l. means for removing contaminants consisting of fillers, fines, coatings and other extraneous materials through the use of one or more clarifiers with select solids separation reagents and polymers; m. means for extracting pulping fluids and water from the recovered fibers to formulate a cellulosic fiber wet lap of about 40% to about 60% pulp solids content; n. means for fluffing the cellulosic fiber wet lap in a cake fluffer and a disk refiner; o. means for drying the fluffed fibers in a flash and/or tunnel dryer; and p. means for conveying the dried fibers to a packaging or baling system. According to the fourth aspect of the present invention, the means for drying comprises: drying the fluffed fibers at a temperature above about 150° F. to about 700° F., thereby reducing bacteria in the fluffed recovered fibers.

According to the fourth aspect of the present invention, the means for drying comprises: drying the fluffed fibers at a temperature above about 300° F., thereby reducing bacteria in the fluffed recovered fibers, and drying them to a uniform moisture content, and wherein the moisture content is between about 10% and about 18%.

According to the fourth aspect of the present invention, the system further comprises q. means for removing inorganic precipitated chemicals and contaminants from the extracted pulping fluids; and r. means for recycling the pulping fluids back to the primary tank/drum/tunnel fiber recovery apparatus. According to the fourth aspect of the present invention, the removed inorganic precipitated chemicals and selected contaminants comprise calcium hydroxide, calcium carbonate calcites, aluminum hydroxide, aluminum oxide, magnesium hydroxide and/or various other minor hydroxides, and wherein the recovered organic cellulosic fibers comprise a final total ash content equal to or less than about 10%.

According to the fourth aspect of the present invention, the recovered organic cellulosic fibers comprise an average fiber length greater than about 0.700 mm. According to the fourth aspect of the present invention, the recovered organic cellulosic fibers comprise an average fiber length greater than about 0.780 mm.

According to a fifth aspect of the present invention, a method for recovering cellulosic fibers from mixed trash is provided comprising: a. loading waste containing cellulosic fibers and other non-organic materials into a sorting apparatus to produce a combination of short and long fiber feedstock; b. blending the sorted trash to maintain ratio of about 50% to about 90% short fiber feedstock and about 10% to about 50% long fiber feedstock; c. shredding the blended sorted fiber feedstock; d. weighing the shredded fiber feedstock into load sizes of about 100 to about 300 lbs; e. pulping the weighed fiber feedstock into cellulosic fibers and a first through fourth group of select waste materials with pulping fluids in a fiber extractor recovery apparatus thereby impregnating the cellulosic fibers with the pulping fluids: f. draining the cellulosic fibers from the extractor fiber recovery apparatus into a hydro-cleaner; g. de-watering the impregnated cellulosic fibers in the hydro-cleaner to reduce the amount of pulping fluid in the impregnated cellulosic fibers, and extracting a portion of the second group of select waste materials; h. depositing the extracted portion of second group of select waste materials into a landfill; i. fluffing the de-watered cellulosic fibers in a first disk refiner; j. thickening the fluffed cellulosic fibers in a thickener and extracting pulping fluid for re-use in the fiber extractor recovery apparatus; k. storing the thickened cellulosic fibers in a stock chest apparatus; l. extracting pulping fluid from the thickened cellulosic fibers in a pulping fluid extractor; m. impregnating additional chemicals comprising fire retardant chemicals, dyes, insecticides, and/or biocides, such that the final cellulosic fiber product comprises a flame retardant loading of about 6%; n. extracting excess pulping fluid from the thickened cellulosic fibers in a pulp press thereby producing partially dried thickened cellulosic fibers; o. fluffing the partially dried thickened cellulosic fibers in a fluffer apparatus that reduces a density of the cellulosic fibers from a first range of about 6 to about 10 lbs per cubic foot to a second density range from about 2 to about 6 lbs per cubic foot, with a post fluffing moisture content of about 40% to about 60%; p. additionally fluffing the cellulosic fibers in a second disk refiner at a temperature between about 150° F. and about 700° F.; q. drying the cellulosic fibers in a dryer to further reduce the moisture content to about 10% to about 18%; and s. packaging and/or baling the dried cellulosic fibers.

According to the fifth aspect of the present invention, the step of pulping comprises: i. rotating and agitating the shredded fiber feedstock in a plurality of fiber recovery apparatuses into cellulosic fibers and first through fourth groups of select waste materials, each of the fiber recovery apparatuses containing pulping fluid, wherein the pulping fluid comprises a combination of water, fire retardant chemicals, biocides, dyes, insecticides and surfactants; ii. impregnating the cellulosic fibers and the first through fourth select waste materials with fire resistant chemicals, dyes, chemical insecticides, and/or biocides; iii. separating the impregnated cellulosic fibers from the first group of select waste materials that are not utilized or desired in separator fiber recovery apparatuses; iv. extracting the first group of select waste materials dissolved within the pulping fluid from the cellulosic fibers in a dirty water tank, DAF contaminant separator, waste tank, sludge press and then depositing the first group of select waste materials into a landfill; v. separating the impregnated cellulosic fibers from the second group of select waste materials in an extractor fiber recovery apparatus; and vi. extracting the second group of select waste materials from the impregnated cellulosic fibers.

According to the fifth aspect of the present invention, the method further comprises t. transferring pulping fluid extracted from the pulping fluid extractor and pulp press to a dirty water storage chest to extract additional inorganic compounds such as calcium carbonate, aluminum and magnesium hydroxide; u. adding one or more acids to the water and pulping fluid stored in the dirty water storage chest to lower the pH of the pulping fluid to a range of about 4.0 to about 5.0; v. mixing the pulping fluids in a first precipitator with one or more alkaline agents to increase the pH of the pulping fluid to a range of about 4.5 to about 6.0 to cause precipitation of aluminum and magnesium hydroxide byproducts; w. centrifuging the mixture of pulping fluids and precipitated aluminum and magnesium hydroxide byproducts in a first centrifuge to separate and discard the aluminum and magnesium hydroxide byproducts; x. adding carbon dioxide to the first centrifuged pulping fluids; y. mixing the pulping fluids in a second precipitator with one or more additional alkaline agents to increase the pH of the carbonated pulping fluids to a range of about 11.5 to about 12.8 or to a pH point wherein calcium carbonate precipitates from the carbonated pulping fluids; z. centrifuging the mixture of carbonated pulping fluids and precipitated calcium carbonate byproducts in a second centrifuge to separate and discard the calcium carbonate byproducts, thereby producing treated white water for use in the recovery process; and aa. storing the treated white water in storage tanks for use in the recover process and apparatus.

According to the fifth aspect of the present invention, step of additionally fluffing the cellulosic fibers in a second disk refiner is omitted, and the step of drying includes drying the cellulosic fibers at a temperature between about 250° F. and 350° F., thereby producing animal and fowl bedding product.

According to a sixth aspect of the present invention, a system for recovering organic cellulosic fibers from landfill materials is provided comprising: a. a stock preparation apparatus configured to prepare a suitable combination of short fiber and long fiber feedstock for use in the cellulosic fiber recovery system from landfill materials and further configured to mix the short fiber and long fiber feedstock with a pulping fluid thereby initially separating the short fibers and long fibers from first through fourth groups of select waste materials, and to further process the first group of select waste materials; b. a stock extraction apparatus configured to further mix the separated short and long fiber feedstock with the pulping fluid, and to extract a second group of select waste materials thereby producing a thickened slurry of cellulosic fibers from the combination of short and long fiber feedstock that is substantially free from the second group of select waste materials; and c. a pulp drying and packaging apparatus configured to extract pulping fluid from the thickened slurry of cellulosic fibers, and which is further configured to separate third and fourth groups of select waste materials from the pulping fluid and to fluff, dry, and bale the thickened slurry of cellulosic fibers as recovered organic cellulosic fibers with a moisture content of about 10% to about 18%.

According to the sixth aspect of the present invention, the first group of select waste materials comprises fillers, coatings, fines, clays, among other non-organic materials, the second group of select waste materials comprises plastics, metals, glass, among others, and the third group of select waste materials comprises calcium carbonate, among others. According to the sixth aspect of the present invention, the fourth group of select waste materials comprises aluminum and magnesium hydroxides, among others, and wherein the stock preparation apparatus comprises: a. a trash sorting apparatus configured to sort gross trash into a first group of trash comprising cellulosic fibers, and a second group of trash that is substantially free of cellulosic fibers; b. a fiber blending apparatus configured to selectively and mechanically blend the first group of trash comprising cellulosic fibers such that a ratio of about 50% to about 90% of short cellulosic fibers and about 10% to about 90% long cellulosic fibers is maintained in the recovery system; c. a shredder apparatus configured to continuously shred the selectively maintained short and long cellulosic fibers into smaller pieces; d. a weigh feeder configured to continuously measure the shredded short and long cellulosic fibers into substantially equivalent loads of about 100 lbs to about 300 lbs per load; e. one or more drums/tunnel pulpers configured to substantially continuously mix pulping fluids with the shredded short and long cellulosic fibers such that separation of short and long cellulosic fibers from first through fourth groups of select waste materials occurs, and treatment of the short and long cellulosic fibers with the pulping fluid occurs; and f. a chemical dissolver configured to produce the pulping fluids from a combination of water, and rapidly penetrating surfactants, dyes, insecticides, biocides, and/or flame retardants.

According to the sixth aspect of the present invention, the short cellulosic fiber comprises fibers of a first length from about 0.5 mm to about 0.7 mm, and the long cellulosic fiber comprises fibers of a second length from about 0.7 mm to about 0.9 mm.

According to the sixth aspect of the present invention, the one or more drums/tunnels are further configured to rotate at substantially equal intervals, and then reverse rotation for a second interval, in the case there are more than one drum/tunnel, in order to transfer the mixture of pulping fluids and shredded short and long cellulosic fibers from a first to a subsequent drum/tunnel, and from the subsequent drum/tunnel to additional subsequent drum/tunnels should there be such additional subsequent drum/tunnels; and wherein the one or more drum/tunnels are further configured to transfer the mixture of pulping fluids, shredded short and long cellulosic fibers into an additional processing stage during the reverse rotation interval.

According to the sixth aspect of the present invention, the fire retardants comprise those fire retardants that when absorbed by the short and long cellulosic fibers meet federal requirements STM C-739, C-1149, C-1497, and CPSC 16 C.F.R. §§208, 1404.

According to the sixth aspect of the present invention, the stock extraction apparatus comprises: i. one or more additional drums/tunnel pulpers configured to further substantially continuously mix pulping fluids with the shredded short and long cellulosic fibers such that separation of short and long cellulosic fibers further occurs from a first and second group of select waste material, and continuous treatment of the short and long cellulosic fibers with the pulping fluid occurs producing a cellulosic fiber slurry, and further wherein the second group of select waste materials is removed from the one or more additional drums/tunnel pulpers, and further wherein the cellulosic fiber slurry is also transferred out of the one or more additional drums/tunnel pulpers; ii. an extractor configured to hold the transferred cellulosic fiber slurry; iii. a hydrocleaner configured to extract still additional second group of select waste materials from the cellulosic fiber slurry; iv. a disk refiner configured to fluff the cellulosic fiber slurry; v. a thickener configured to remove water and/or additional liquids from the fluffed cellulosic fiber slurry such that the percentage of cellulosic fibers with the fluffed cellulosic fiber slurry increases from a first range of about 1.5% to about 2% to a second range of about 3.0% to about 4.5%; and vi. a plurality of white water holding tanks configured to hold the water and other liquids removed by the thickener.

According to the sixth aspect of the present invention, the pulp drying and packaging apparatus comprises: i. a pulping fluid extractor configured to extract additional pulping fluid from the thickened cellulosic fiber slurry; ii. an additional chemical dissolver tank to produce an optional fire retardant spray comprising fire retardant chemicals, dyes, insecticides and/or biocides, wherein the optional fire retardant spray can be applied to the thickened fiber cellulosic slurry; iii. a pulp press configured to extract additional water and/or other liquids such that the thickened fiber cellulosic slurry is about 40% to about 60% solids, thereby producing cellulosic fiber wet lap; iv. a fluffer configured to fluff the cellulosic fiber wet lap into a fluffed cellulosic fiber wet lap; v. a disk refiner configured to additionally fluff the fluffed cellulosic fiber wet lap; vi. a flash/tunnel dryer configured to dry the fluffed cellulosic fiber wet lap at a temperature between about 150° F. and about 700° F., thereby reducing a moisture content to a range of about 10% to about 18%; and vii. a packaging or bailing apparatus configured to package or bail the substantially dry fluffed cellulosic fiber wet lap.

According to the sixth aspect of the present invention, the system further comprises a water treatment apparatus configured to recover pulping fluid at various points in the recovery process, separate the third and fourth group of select waste materials from the pulping fluid thereby creating treated white water which can then be returned to the recover system for continuous recovery of organic cellulosic fibers from landfill materials.

According to the sixth aspect of the present invention, the water treatment apparatus comprises: a. an acid supply tank configured to store a supply of one or more acids, comprising sulfuric acid, phosphoric acid, acidic acid, among others; b. a dirty water storage tank configured to receive pulping fluids removed from the fluffed cellulosic fiber slurry by the thickener and further configured to add one or more of the acids stored in the acid supply tank such that a pH level of the pulping fluids is reduced to a range of about 4.0 to about 5.0 so as to dissolve one or more organic compounds comprising calcium carbonate, aluminum hydroxide, magnesium hydroxide, among others; c. a first alkaline agent holding tank configured to store one or more agents comprising sodium tetraborate, sodium borates, calcium borates, ammonium hydroxide, anhydrous ammonia, lime, and/or soda ash, among others; d. a first precipitator configured to the receive water and/or additional liquids from the dirty water storage tank, and further configured to add one or more of the agents stored in the first alkaline agent storage tank such that a pH level of the received pulping fluids is increased to a range of about 4.5 to about 6.0 so as to cause precipitation of aluminum and magnesium hydroxide byproducts; e. a first centrifuge configured to received the pulping fluids from the first precipitator, and further configured to centrifuge the first precipitated pulping fluids to separate and collect the aluminum and magnesium hydroxide byproducts; f. a carbonator configured to receive the pulping fluids from the first centrifuge, and further configured to add carbon dioxide to the pulping fluids; g. a second alkaline agent holding tank configured to store one or more agents comprising sodium tetraborate, sodium borates, calcium borates, ammonium hydroxide, anhydrous ammonia, lime, and/or soda ash, among others; h. a second precipitator configured to receive the pulping fluids from the carbonator, and further configured to add one or more of the agents stored in the second alkaline agent storage tank such that a pH level of the received pulping fluids is increased to a range of about 11.5 to about 12.0, or to such pH level so as to cause precipitation of calcium carbonate; i. a second centrifuge configured to received the pulping fluids from the second precipitator, and further configured to centrifuge the second precipitated pulping fluids to separate and collect the calcium carbonate; and j. a treated white water storage tank configured to store and transfer the treated white water now substantially free of calcium carbonate, and aluminum and magnesium hydroxide byproducts and which has a pH level in the range of about 11.5 to about 12.0. According to the sixth aspect of the present invention, the flash/tunnel dryer is configured to dry the fluffed cellulosic fiber wet lap at a temperature between about 250° F. and about 350° F.

BRIEF DESCRIPTION OF THE DRAWINGS

The advantageous structure and/or methods according to the present invention will be more easily understood from the following detailed description of the preferred embodiments and the appended drawings, as follows.

DETAILED DESCRIPTION OF THE PRESENTLY PREFERRED EXEMPLARY EMBODIMENTS

Introduction

Figure 1:
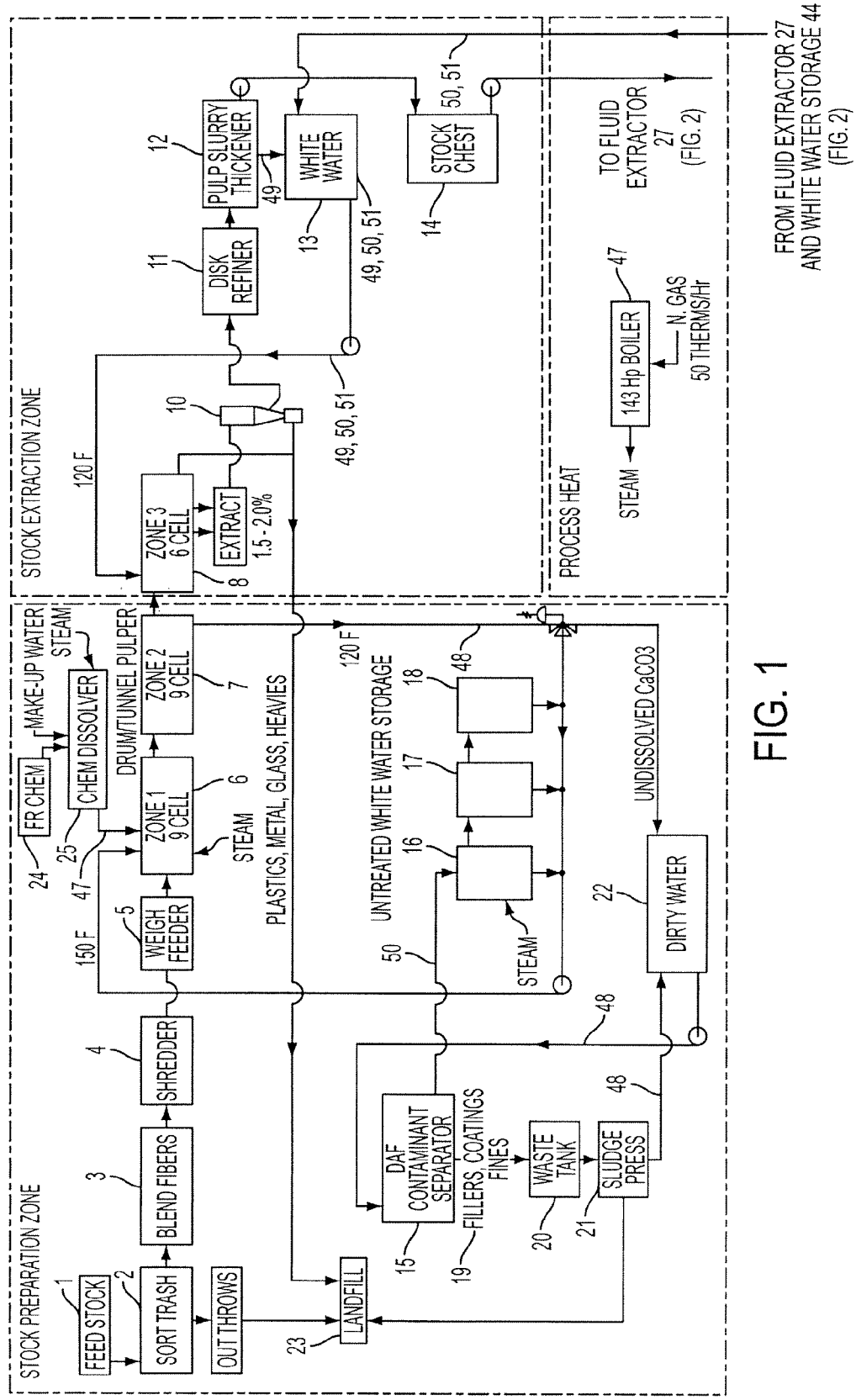
FIG. 1 is a schematic diagram of the structure and method of the stock preparation zone, the stock extraction zone, and the process heat element according to a preferred embodiment of the present invention.

A notable aspect of the present invention has been the discovery that the increasing quantities of inorganic compounds found in the various solid and fiber-containing household and industrial waste materials adversely affect the physical properties of cellulosic thermal insulation. The physical properties that primarily affect thermal insulation in a substantially negative way are bulk density, thermal resistance, and nuisance dust content. All three of these properties are important in manufacturing an effective thermal insulation product.

Thermal resistance, or R-value, measures cellulose insulation's effectiveness. High quality insulation products are more effective because of their high R-values. Creating air spaces around the fibers, the natural fiber wall of the cells, and the air cells that naturally exist within the fibers themselves, maximize R-value in cellulose insulation. R-value degrades with the addition of inorganic particles, including fire retardant chemicals that tend to be conductors of thermal energy rather than insulators. Therefore, minimizing the amount of inorganic particles within cellulose insulation will increase its thermal performance. Inorganic particles are collectively referred to as "ash".

There is a direct correlation between inorganic levels in the finished product and the product's density and dust level. R-value is a function of a product's design density as well. As cellulose insulation density increases, the R-value decreases. The optimal density for cellulose insulation that maximizes the R-value is a range between about 1.3 and about 1.7 pounds per cubic foot. Inorganic particles that are not removed increase a product's density, effecting R-value (making it lower) and hence the coverage of the finished product.

An attribute of quality that is normally not tested by manufacturers, but which is a significant issue for customers (installers), is the level of dust that the product emits while installing it. High dust levels during installation is extremely uncomfortable for the installer, makes it difficult for them to see their application and creates challenges for living environments within a home. A high dust level indicates high levels of inorganic components that free themselves during the installation of the product.

Cellulosic insulation manufactured according to the exemplary embodiments of the present invention described herein contain significantly reduces levels of ash than other manufacturer's cellulosic insulation product. Various competitor's ash content are, an average, about 15.59%, whereas the ash content of the cellulosic insulation manufactured according to the preferred embodiments of the present invention is about 8.09%, a decrease of about 100%.

Even when starting with low-ash content raw materials (such as golf ball boxes), because addition of the fire retardant chemicals adds ash, reduction of total ash content remains an important feature of the method and system according to an embodiment of the present invention.

Managing the ash content in the pulping process is a significant issue that affects product quality and usability (density and dust). As the ash content values discussed above indicate, the reduction achieved by competitors' products is minimal since most of the fillers (ash) is contained within the insulation pieces and holds the fibers together. Therefore, minimizing the ash content of the fiber insulating product is very important, otherwise an extremely dusty product with high density levels will be produced.

Further, another attribute that determines the effectiveness of the cellulosic insulation product is fiber length, and thus overall density of the product. Longer fibers will improve (lower) a product's density and by maintaining fiber structure, fewer fractured or short fibers are evident that could become part of the dust level in the finished product. As Table III below indicates, the system and method of pulping fibers according to the preferred embodiments of the present invention produce, on average, longer fibers than competitors' products as a result, in part, through the pulping of the cellulosic fibers through the disk refiner among other steps and apparatus of the present invention. Competitors generally use dry processing, and as a result, their average fiber lengths are, an average, about 0.521 mm. The system and method for pulping fibers according to the preferred embodiments of the present invention produces fibers on average of about 0.781 mm, an increase, on average, of about 14% in length.

TABLE II

Comparison of Ash Levels of Insulation Products Manufactured According to an Embodiment of the Present Invention, and Other Materials

| Material | Avg. % Ash |
| --- | --- |
| Cellulosic Fiber Insulation Manufactured According to an Embodiment of the Present Invention | 8.09 |
| Competitor Insulation | 15.59 |
| Sludge | 16.67 |
| Foil Laminates | 14.17 |
| White Fiber | 7.85 |

As can be seen from Table II, which shows the ash content of several different materials, cellulosic fiber insulation products manufactured using the system and method according to the different embodiments of the present invention achieve significantly lower ash contents. The cellulosic fiber insulation product manufactured according to an embodiment of the present invention has an ash content on average of about 8.09%. A competitor's fiber insulation product has an ash content on average of about 15.59%. The ash content of sludge, which is the waste material created by the system and method according to an embodiment of the present invention that is sent to the landfill (see FIG. 1, output of sludge press 21, and landfill 23), has an ash content on average of about 16.67%. Thus a significant amount of ash is removed during the manufacturing process. The ash content of foil laminates, which are raw materials going into the system (see feedstock 1 in FIG. 1) is, on average, about 14.17%. This shows that a significant amount of ash is removed from the raw waste materials during the process according to an embodiment of the present invention. Finally, only when very select raw materials are tested, in this case white fiber, is the ash content lower at about 7.85% on average. In the aforementioned test analysis, golf ball boxes were used as a source of white fiber.

TABLE III

Comparison of Fiber Length and Width of Insulation Products Manufactured According to an Embodiment of the Present Invention, and Other Materials

| (ii) Material | Average Length (mm) |
| --- | --- |
| Cellulosic Fiber Insulation Product Manufactured According to an Embodiment of the Present Invention | 0.781 |
| Competitor Insulation | 0.685 |
| Sludge | 0.666 |
| Foil Laminates | 0.689 |
| White Fiber | 0.849 |

Table III illustrates the results of testing of average lengths of fibers of the cellulosic fiber insulation product as manufactured according to an embodiment of the present invention versus other materials as discussed and shown in Table II. The increase in length of the product as manufactured according to an embodiment of the present invention versus that of the competitor results in an optimization of the density of the cellulosic fiber insulation product. Again, as with Table II, it is only when a material is handpicked to have optimal length properties (the white fiber material, i.e., golf ball boxes) does the length characteristics exceed that of the product as manufactured according to an embodiment of the present invention that is made from an assortment of waste materials.

It has been further discovered that these inorganic compounds cannot be removed from the waste feedstock using conventional dry process fiberization equipment due to the inorganic compounds being an integral and impregnated part of the fiber structure. Such compounds are removed by dissolving these compounds and then precipitating them from the liquid pulping fluids. The present invention uses a wet pulping process utilizing a fiber recovery apparatus to recover cellulosic fibers from landfill materials, and to manufacture a composition of cellulosic insulation with low ash content with specific performance and composition characteristics. For example, the cellulosic insulation composition according to the present invention may comprise cellulosic fibers impregnated with liquid flame retardants, dyes, insecticides, decay inhibitors, and/or biocides. Note that fiber pulp is the end result of the process machine. The present invention does not propose to pulp the fiber, but rather pulp the feedstock.

As a brief overview, dry or wet waste containing cellulosic fibers and other non-organic materials (such as plastics, metal, clay, and calcium carbonate) is preferably loaded into a fiber recovery apparatus and, while being agitated, is washed in water, surfactants, decay inhibitors, and polymers, and then is impregnated with fire retardant chemicals, dyes, insecticides, and/or biocides. During pulping, the cellulosic fibers become separated from select materials that are not utilized or desired in the final product. The cellulosic fibers are drained out of the fiber recovery apparatus with the pulping fluid described herein, leaving the select non-cellulosic materials (i) in the fiber recovery apparatus for disposal or (ii) in the pulping fluid, where additional inorganic materials are precipitated and recovered out of the pulping fluid. The cellulosic fibers are then transferred into a series of process steps including a dewatering press to reduce the amount of water in the cellulosic fibers, then fluffed, dried, and packaged.

For the purpose of this discussion, and as shown in the drawings, process liquor (or pulping fluid as it hereinafter will be referred to) is defined as a combination of water, fire retardant chemicals, biocides, insecticides, dyes, and surfactants. Pulping fluid is the fluid that aids in pulping and flocculation of the commingled waste according to an embodiment of the present invention.

Because the system and process described herein is designed to operate continuously, in order to increase efficiency and hence its economic performance, the fluids used throughout the system will be continuously changing in terms of chemical composition and contaminants, as those of ordinary skill in the art can appreciate. However, in order to facilitate an understanding of the system and method of the embodiments of the present invention, the liquids that are utilized within can be defined as follows: For the purpose of this discussion, and as shown in the drawings, pulping fluid 47 is defined as a combination of water, fire retardant chemicals, biocides, insecticides, dyes, and surfactants. Process liquor, or pulping fluid 47, is the fluid that aids in pulping and flocculation of the commingled waste according to an embodiment of the present invention. Pulping fluid 47 is the state of the fluid at the point of start up, when all the storage tanks and cells are filled with the fluid to aid in de-pulping and flocculation. Pulping fluid 47 is the fluid leaves chemical dissolver tank 25 as shown in FIG. 1. Pulping fluid 47, as described in greater detail below, is periodically withdrawn from the system at various points, and can be cleaned and/or refined to become treated white water 51 that is in a state that approximates that of the original pulping fluid 47. As such, pulping fluid 47 can have different levels and types of contaminants at different points in the system and process according to the embodiments of the present invention.

Pulping fluid 47 is inserted into Zone 1 of apparatus 6 from chemical dissolver tank 25. Pulping fluid 47 is mixture of water, surfactants, insecticides, biocides, dyes and fire retardant chemicals. As soon as pulping fluid 47 starts mixing with the landfill waste it becomes dirty. Dirty water 48 is extracted from Zone 2 of apparatus 7. Dirty water 48 is the most contaminated fluid within the system. The liquid that is carried into Zone 3 of apparatus 8 is cleaner than dirty water 48 and is called white water 49. White water 49 is substantially free of solids (fillers, contaminants and coatings; which is what makes dirty water dirty).

A portion of dirty water 49 is returned to fiber recovery apparatuses 6, 7 and 8, untreated, and not cleaned at all. Most of dirty water 48, however, is sent to dirty water tank 22. Dirty water 48 is then sent to DAF containment separator 15; its output is untreated white water 50 (meaning it is cleaner (no solids) than dirty water 48, but contains calcium carbonate, and aluminum and magnesium hydroxides). Untreated white water 50 is stored (tanks 16, 17 and 18) and is added to dirty water 48 that is taken from Zone 2.

White water 49 is extracted from thickener 12, and is immediately recycled back to Zone 3, after being combined with untreated white water 50 and treated white water 51. Some of white water 49—or pulping fluid with containments ($CaCO_3$ aluminum and magnesium hydroxide by products) is retained by the fibers. In pulping fluid extractor 27, untreated white water 50 is extracted from the fibers. While untreated white water 50 contains calcium carbonates, and aluminum and magnesium hydroxides, it can be immediately re-used, because it has the chemicals needed by the system (fire retardants, surfactants, biocides, insecticides, dyes, among others), and is substantially free of solid contaminants. The balance of untreated white water 50 is sent to the water treatment zone (See FIG. 2) to remove the calcium carbonate and aluminum and magnesium hydroxides, the process of which is described in greater detail below.

Once the calcium carbonates and aluminum and magnesium hydroxides are removed from untreated white water 50, the cleaned liquid is referred to as treated alkaline white water 51. Therefore, in terms of "cleanliness" the following is a list of the fluids used in the system and method according to an embodiment of the present invention from cleanliest to dirtiest: pulping fluid 47; treated alkaline white water 51; white water 49; untreated white water 50; and dirty water 48.

Of course, as those of ordinary skill in the art of the present invention can appreciate, there is no set chemical/solid composition that completely defines the differences between pulping fluid 47, dirty water 48, white water 49, untreated white water 50, or treated white water 51, and as such the definitions are not intended and should not be construed to limit the scope of the exemplary embodiments of the present invention, but are merely intended to be used as an aid for the reader to understand the processes and systems described herein.

The system and method of the present invention involves the use of disposed products that contain cellulosic fibers (such as beater dye, MRF residual, fibers laminated with plastic and/or metal foil, pulp sludge, wet cellulosic fibers, industrial waste, mixed waste, post-consumer mixed recyclables, mixed office waste, post-consumer industrial fiber waste, and other commercial waste) to preferably manufacture cellulosic insulation with certain characteristics (including a total ash content equal to or less than about 10%). These disposed products are currently sent to a landfill because they are typically unsuitable to be processed into other commodities or products, and typically have an ash content of over about 15%.

The Structure and Process of the Preferred Embodiments

Figure 2:
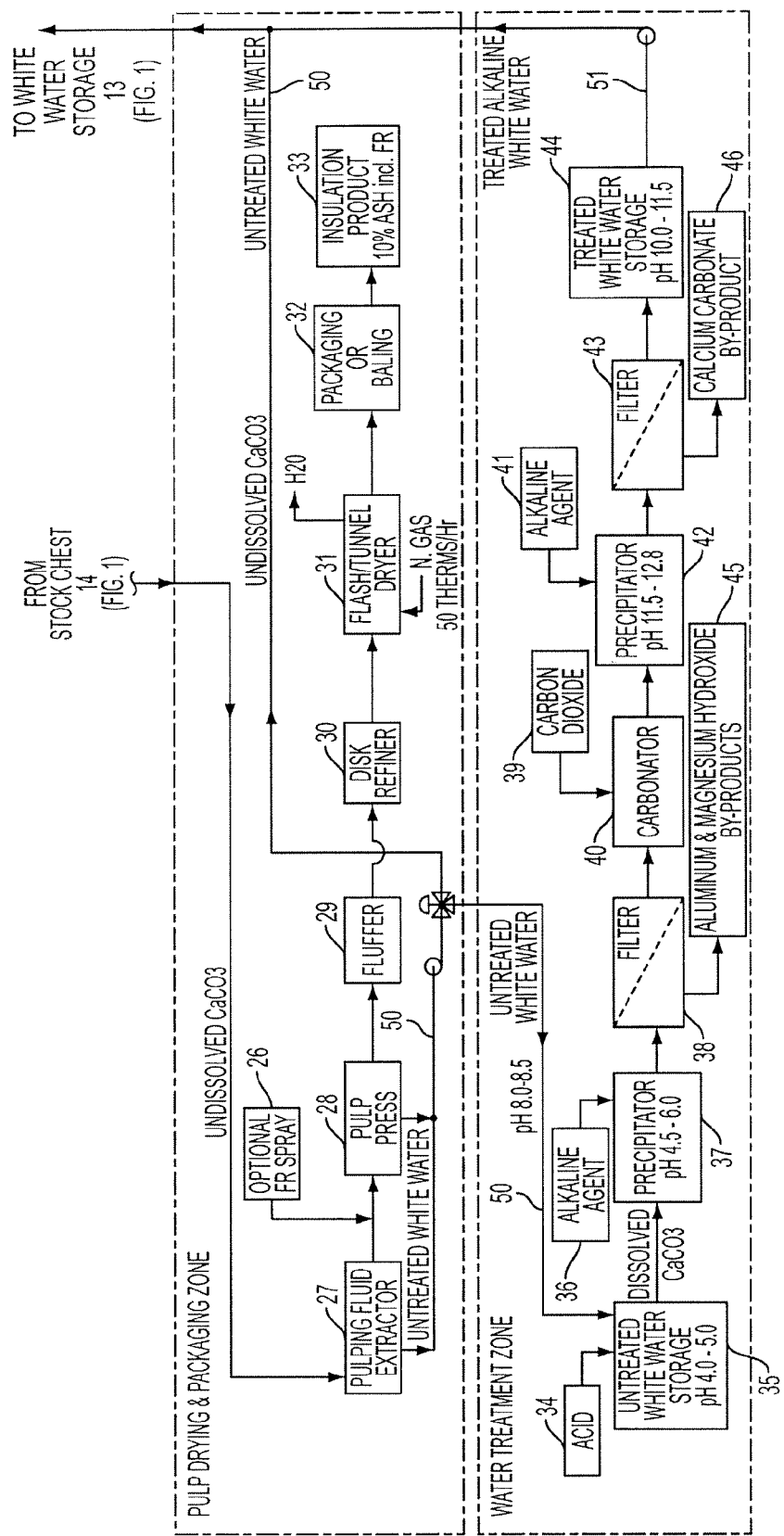
FIG. 2 is a schematic diagram of the structure and method of the water treatment zone and the pulp drying and packaging zone according to a preferred embodiment of the present invention.

In FIGS. 1 and 2, there is shown a schematic view of the structure and process in accordance with the preferred embodiment. The system includes a manual trash-sorting station 2, a fiber blending chamber (blending chamber) 3, a shredder 4, a weigh feeder 5, multiple zone fiber recovery apparatuses 6, 7, and 8, a hydro-cleaner 10, a disk refiner 11, a dissolved air flotation (DAF) contaminant separator or water clarifier (water clarifier) 15, a pulp slurry thickener 12, pulping fluid extractor (otherwise known as pulp dewatering presses) 27 and pulp press 28, a pulp fluffer 29, a disk refiner 30, a flash/tunnel dryer (dryer) 31, and a packaging or baling (packaging) system 32, among other components.

Various waste materials 1 containing cellulosic fibers are sorted of gross trash (out throws) in the manual trash-sorting station 2, then they are selectively and mechanically blended in a chamber 3 by maintaining a preferred ratio of about 50% to about 90% short fiber feedstock and about 10% to about 50% long fiber feedstock, and then conveyed to a shredder 4 as manufactured by Saturn (model #Z2A) where the material is reduced in size. According to an exemplary embodiment of the present invention, short fibers are those fibers whose average length ranges from about 0.5 mm to about 0.7 mm, and long fibers are those fibers whose average length ranges from about 0.7 mm to about 0.9 mm. An example of cellulosic fibers that can be input to the system according to an embodiment of the present invention that are short fibers is the Foil laminates material described above, with an average length of about 0.689 mm. An example of cellulosic fibers that can be input to the system according to an embodiment of the present invention that are long fibers is the white fiber material described above, with an average length of about 0.849 mm. The material continues to a weigh feeder 5 as manufactured by Ronan (model X96S) to measure load sizes of about 100 lbs to about 300 lbs, depending on the size of the fiber recovery apparatuses 6, 7 and 8, and on automatic un-pulped material feedback from points later in the system.

One type of fiber recovery apparatus 6, 7, and 8 is a model #76039P4F Continuous Batch Tunnel Washer manufactured by Pellerin Milnor Corporation of Kenner, La., U.S.A. that is typically used for the washing of textile goods (such as clothes) and has perforated drums rotatable within multiple end-to-end compartments, or chambers, as described herein. Continual processing of the waste through the system provides an efficient means for separating the cellulosic fibers from various contaminants. Additionally, a continuous batch system results in an equilibrium of the chemical and other conditions within the apparatus to be established as the waste is processed due to the continuous recirculation of the pulping fluids. Other pulping systems (such as drum, tank or tunnel type pulping machines) may be used as fiber recovery apparatus 6, 7 or 8, that provide various levels of fiber separation from undesirable contaminates. Of course, the fiber recovery apparatus may comprise a single apparatus 6, two apparatuses, three apparatuses (as shown in FIG. 1), or more sections, as desired. The first and second zones of apparatus 6 and apparatus 7 in the fiber recovery apparatus are substantially similar to each other. One or more of these apparatuses may include steam injection. Preferably, the process heat and steam are provided by a 143 Hp boiler, fed with natural gas and capable of generating 50 Therms/hr. 47, as manufactured by Williams Davis Boiler, Inc.

In more detail, approximately equal volumes or loads of waste material (from about 100 lbs to about 300 lbs) are loaded into the first chamber of the first zone of the fiber recovery apparatus 6 (preferably comprising nine cells). As each load of waste is transferred from the first chamber (or cell) into the second chamber (or cell) of the first apparatus 6, a new load of waste replaces it so that a steady stream of waste is continuously processed in the system. This waste continues through the remaining chambers (or cells) of the fiber recovery apparatuses 6, 7, and 8.

The multiple chambers (or cells) in each of apparatus 6, 7 and 8 are rotated for predetermined, essentially equal intervals e.g., about 20 minutes. At the end of each interval, a predetermined sequence of reverse rotation is initiated so as to transfer the batch in the chamber to a succeeding chamber. At the same time, the batch in the last chamber of apparatus 6 is transferred to the first chamber of apparatus 7 and the last chamber of apparatus 7 transfers the batch into the first chamber of apparatus 8. The fiber recovery apparatuses 6, 7 and 8 uses a continuous flow of pulping fluid 47 that includes water, fire retardant chemicals, dyes, insecticides, biocides and surfactants that flows through the fiber recovery apparatus. The composition of pulping fluid 47 may consist of the following ingredients depending on the type of finished product that is being manufactured:

TABLE IV

Pulping Fluid Composition

| INGREDIENTS | PERCENTAGE RANGE (all ranges from about a first percentage to about a second percentage) |
| --- | --- |
| Water | 80.0 to 95.0% w/v |
| Flame Retardant's | 0.5 to 20.0% w/v |
| Surfactants | 0.001 to 2.0% w/v |
| Boron Insecticides | 0.12 to 3.0% w/v |
| Biocides | 0.001 to 2.0% w/v |
| Dyes | 0.05 to 2.0% w/v |

The flame retardants comprise about 40% to about 60% ammonium sulfate $(NH_4)2SO_4$ and from about 40% to about 60% boric acid $H_3BO_3$. Alternatively, a product can also be used that includes no ammonium sulfate as a fire retardant and 100% boric acid.

Pulping fluid 47 is preferably maintained at a temperature of at least 120° F. to insure that the chemicals added to pulping fluid 47 remain in solution, and to increase the pulping activity within the chambers. According to an alternative embodiment of the present invention, pulping fluid 47 can work properly at temperatures that range from about 50° F., to about 200° F. Preferably, pulping fluid 47 is kept at a level that covers approximately ⅓ of each chamber within the fiber recovery apparatus. Agitation due to the rotation of the chambers promotes separation of the cellulosic fibers from any contaminants so as to form a cellulosic fiber slurry.

The first two fiber recovery apparatuses 6 and 7 are referred to as the separation zones. Preferably, the apparatus 6 referred to as zone 1 and apparatus 7 referred to as zone 2 includes nine cells each, and the apparatus 8 includes six cells referred to as zone 3. Pulping fluid 47 utilized in the separation zones 1 and 2 is preferably circulated in a closed loop that includes a series of one or more untreated white water 50 holding tanks 16, 17 and 18 (one or more of which may include steam injection). Pulping fluid 47 used in the fiber recovery apparatus 6, 7 and 8 and white water 49 pressed from the cellulosic fibers in the pulp dewatering presses 27, as manufactured by Fields & Boyd Wedge Belt Press (model # XLWT-80) and 28, as manufactured by Rietz (60 inch V-Press) includes various inorganic chemicals such as clays, calcites, talc, fluorspar, feldspar and other contaminates such as metals, glass, minerals and plastics that are released from the waste during the pulping process. White water 49 is processed thorough one or more hydro-cleaners 10, as manufactured by Black-Clawson (HD Cleaner). Dirty water 48 is processed through water clarifiers 15, as manufactured by Beloit ((DAF Clarifier), to which are added selected promoter and collector reagents and polymers comprising of crude or refined fatty acids, petroleum sulfonates, sulfonated fatty acids, fatty amines and amine salts at dosages of about 0.1 to about 2.0 pounds per ton of waste materials processed to selectively remove fine contaminants 19 (such as clay, other inorganic material, and ultra fine organic fibers) from dirty water 48 that is then pumped to storage tank 20, and a sludge press 21 as manufactured by Andritz (Andritz 0.3 Meter Press), for disposal to a landfill 23. The rate of removal of the above described contaminants at water clarifier 15 is based on the density and fines content of the final product (after packaging 32) that is measured using conventional methods such as ASTM C-739 for determining the settled density of cellulosic insulation and TAPPI T-413 for determining the ash content of paper pulp.

Pulping fluid 47 additionally preferably comprises water containing fire retardant (FR) chemicals 24, dyes, insecticides, biocides, surfactants and decay inhibitors [as listed in Table III] that are added in solution utilizing a chemical dissolver or chemical add feeder apparatus 25 preferably fed with steam and make-up water. The fire retardant chemicals and other chemicals are preferably absorbed by the cellulosic fibers to provide a finished product that, after packaging system 32, meets federal requirements ASTM C-739, C-1149, C-1497, CPSC 16 CFR209 and 1404 for product performance with a total ash content equal to or less than 10%, and preferably an average, with an ash content of about 8.09%.

The solid waste material moves through the washing chambers in the extraction zone 3, fiber recovery apparatus 8 where the plastics, glass metal foil and other contaminates are separated from the cellulosic fibers.

From the last chamber in zone 2, fiber recovery apparatus 7, the waste material is transferred to the first chamber in zone 3, fiber recovery apparatus 8, that is referred to as the extraction zone. The cellulosic fiber slurry that has been transferred into the first and succeeding chambers of zone 3 of the fiber recovery apparatus 8 are washed within zone 3, apparatus 8, and the separated cellulosic fibers are permitted to pass through perforations in the drums of the chambers of zone 3 fiber recovery apparatus 8 in a (preferably) 1%-2% cellulose fiber slurry for further processing. The remaining material (comprising larger inorganic contaminants that remain in the extraction zone 3, fiber recovery apparatus 8) are transferred out of the last chamber for disposal to a landfill 23. Dirty water 48 at 120 degrees Fahrenheit is preferably output from fiber recovery apparatus 7 to a dirty water tank 22, where it may be processed with or separately from untreated white water 50 stored in tanks 16, 17, and 18.

The cellulosic fiber slurry that has been filtered through the perforations in the chambers of zone three, apparatus 8, of the fiber recovery apparatus is transferred into an extract tank (stock tank) 9 for further processing. The cellulosic slurry is transferred from the stock tank 9, through the hydro-cleaner 10, which de-waters ("de-waters" being used generally to describe the process of removing all liquids (not just water) present in the cellulosic slurry) the cellulosic slurry, as manufactured by Black-Clawson (HD Cleaner), to a disk refiner 11, as manufactured by Ring-R (model 48-S), which fluffs (or de-lumps) the fiber bundles following the de-watering that occurs in hydro-cleaner 10. The de-lumped fiber cellulosic slurry is then transferred to a slurry thickener 12, as manufactured by Black Clawson (48×144 Thickener), where the percentage of cellulosic fibers within the slurry is increased from a first range of about 1.5% to about 2.0% to a second range of about 3.0% to about 4.5% for further processing. The thickened cellulosic fiber slurry is then transferred into a stock chest (or stock tank) 14 that holds the cellulosic slurry prior to feeding the pulp drying and packaging process (to be described below). The thickened cellulosic fiber slurry is transferred from the stock tank 14 to a pulping fluid extractor 27, as manufactured by Fields and Boyds (Wedge Belt Press XLWT-80) (FIG. 2), and to a water press 28, as manufactured by Rietz (V-Press), where liquid—in this case, untreated white water 50—is pressed out of the slurry so that the remaining material coming out of the pulping fluid extractor and the pulp press is about 40% to about 60% solids. This remaining material is referred to herein as "cellulosic fiber wet lap".

An optional FR spray station (second chemical add station) 26 can be provided after the pulping fluid extractor 27, for example, by spraying the cellulosic fiber wet lap with additional chemicals that include liquid flame retardants, dyes, insecticides and/or biocides that have been dissolved in water (see above, Table III: Pulping Fluid Composition). The amount of chemical sprayed on the cellulosic fiber wet lap is based on final product quality and various product performance requirements. The final cellulosic insulation 33 of the preferred embodiment has a flame retardant chemical loading of approximately 6% that is well below the current industry standard using a predominately dry process of 10% to 20%.

The cellulosic fiber wet lap is conveyed from the optional chemical spray station 26 to a pulp press 28, as manufactured by Rietz (V-Press), and then to a fluffer 29, as manufactured by Sprout-Bauer (refiner #DM-36), that fluffs the cellulosic fiber wet lap from a first density range of about 6 to about 10 lbs per cubic foot to a second density range of about 2 to about 4 lbs per cubic foot with a moisture content of about 40% to about 60%.

The fluffed cellulosic fiber wet lap is then conveyed to a disk refiner 30, as manufactured by Ring-R (attrition mill model 48-S). Disk refiner 30 aids in fluffing (i.e., de-lumping) the fiber bundles following the de-watering processes and thus improves the efficiency of the drying process that follows the disk refiner 30. The fluffed cellulosic fiber wet lap is then to a conventional industrial dryer 31, as manufactured by Wolverine Proctor & Swartz (model K17305), where the dryer reduces the moisture content of the cellulosic fibers to a range of about 10% to about 18%. Dryer 31 dries the fluffed cellulosic wet lap at a temperature between about 150° F. and about 700° F., and the output is processed cellulosic insulation 33. The processed cellulosic insulation 33 is then conveyed into a traditional packaging/baling apparatus 32.

According to an alternative embodiment of the present invention, a second flash/tunnel dryer 31*a* can be inserted prior to disk refiner 30, or, subsequent to existing flash/tunnel dryer 31. In the former case, the first dryer can be a tunnel dryer, followed by disk refiner 30, followed by flash dryer 31. In the latter case, the two dryers can both be the same, either flash or tunnel, or can be different (flash and tunnel). Placing the disk refiner between the two dryers refines the cellulosic fiber product at a moisture content between about 20% to about 25%, rather than about 50%.

Untreated white water 50 extracted from pulping fluid extractor 27 and pulp press 28 is preferably transferred to untreated white water storage chest 35 to remove additional inorganic compounds such as calcium carbonate 46, and aluminum and magnesium hydroxide 45, among others, that can be commercially sold to reduce the overall cost of the process described herein. An acid 34 such as sulfuric acid, phosphoric acid, or acidic acid, among others, is preferably added to untreated white water 50 in storage chest 35 to lower the pH of untreated white water 50 to a range of about 4.0 to about 5.0 so as to dissolve the inorganic compounds listed above. The solution is then transferred to a precipitator 37, as manufactured by US Filter (models 001 through 012 depending on production capacity required). Alkaline agents 36 such as sodium tetraborate, sodium borates, calcium borates, ammonium hydroxide, anhydrous ammonia, lime, and/or soda ash, among others, are then added to the solution in the precipitator 37 to increase the pH to a range of about 4.5 to about 6.0 so as to cause precipitation of aluminum and magnesium hydroxide byproducts 45 that are then recovered with a batch or continuous flow filter/centrifuge 38 as manufactured by Western States Machine Company. The remaining solution is then transferred to a carbonator 40, as manufactured by Niro Inc., where carbon dioxide 39 is added to the solution, and the solution is then transferred to a precipitator 42, as Manufactured by US Filter, where additional alkaline agents 41 such as sodium tetraborate, sodium borates, calcium borates, ammonium hydroxide, anhydrous ammonia, and lime, among others, are added to increase the pH to a range of about 1.5 to about 12.8, or to a point where suitable quantities of calcium carbonate 46 will precipitate out of the solution. The solution is then pumped through a filter/centrifuge 43, as manufactured by the Western States Machine Company, for removal of the calcium carbonate 46. The remaining solution, hereinafter referred to as treated white water 51, is then transferred into treated white water storage chest 44 and re-circulated to the fiber recovery apparatus. As FIG. 2 illustrates, treated white water 51 is combined with untreated white water 50 and both are sent to white water storage chest 13.

Animal and Fowl Bedding Products

As discussed above, the system and method discussed above can also be used for the manufacture of animal and fowl bedding, with only slight modifications in the system and method according to the embodiments of the present invention. The manufacturing process described above is modified to exclude disc refiner 30 (see FIG. 2) in order to maintain adequate fiber bundles that yield a finished bulk density animal and fowl bedding product with a range in density from about 2 lbs per cubic foot to about 6 lbs per cubic foot. The animal and fowl bedding product is also dried to a uniform moisture level of about 10% to about 18%, similarly to that as described above in regard to the manufacture of cellulosic fiber insulation products. Mold and bacteria, which are a significant problem with conventional wood shavings or sawdust, are significantly reduced when animal and fowl bedding manufactured according to the embodiments of the present invention. Animal and fowl bedding products manufactured according to the embodiments of the present invention have consistent—and low—levels of moisture.

Another substantial advantage of the animal and fowl bedding product produced by the system and method according to an embodiment of the present invention is that such animal and fowl bedding product is substantially free of contaminants. While the animal and fowl bedding products manufactured according to the embodiments of the present invention can be made substantially free of containments, certain desirable agents that originate in the raw materials can be left in the animal and fowl bedding product. Furthermore, according to an embodiment of the present invention, the animal and fowl bedding product can be applied easier than prior art bedding products. For example, animal and fowl bedding product manufactured according the system and method of the present invention can be applied to desired locations by a pneumatic spreading device, which is very easy and efficient to use versus mechanical or manual spreading of prior art shavings, sawdust or pellets.

Animal and fowl bedding produced according to the embodiments of the present invention processes waste material containing cellulosic fibers of mixed length, and creates fiber bundles that have a higher level of memory retention than competitors' animal and fowl bedding products, thus improving moisture holding capability, thickness for thermal benefit and reconstitution. As a result, consumers, whether private or commercial/industrial, will successfully endeavor to reconstitute or fluff up their bedding to allow it to dry and gain additional life from the animal and fowl bedding product. Animal and fowl bedding product manufactured according to a preferred embodiment of the present invention incurs between about 40% to about 50% less compaction compared to conventional paper-based animal and fowl bedding products.

Furthermore, because of the flexibility of the manufacturing process described above according to several embodiments of the present invention, a nearly limitless amount of additives can be inserted to the fibers in such a way that the additives become part of the fiber composition and therefore are not susceptible to separation.

Further still, manufacturing animal and fowl bedding product according to the embodiments of the present invention removes high levels of inorganic components therefore providing a paper-based product that has higher absorption qualities per pound of product, holds its structure better and therefore provides a higher level of thermal barrier. Compared with conventional paper-based animal and fowl bedding, the animal and fowl bedding product manufactured according to an embodiment of the present invention, demonstrates between about 15% to about 20% higher absorption level. The animal and fowl bedding product manufactured according to exemplary embodiments of the present invention has improved moisture absorption capabilities because of the higher ash content as compared to known animal and fowl bedding products.

According to a preferred embodiment of the present invention, animal and fowl bedding product manufactured according to the processes and system described herein, with the modification of subjection of the product to a step that includes applying heat (or drying) at a temperature between about 250° F. and about 350° F., provides a product that substantially reduces the ability for mold and bacteria to grow on the animal and fowl bedding. According to a preferred embodiment of the present invention, the fibers are dried at a temperature above about 300° F. Other advantages of animal and fowl bedding manufactured according to the processes and system described herein includes: substantially higher absorbency than wood shavings, sawdust or straw (e.g., in the order of about 4 to about 6 times greater absorbency); substantially higher absorbency than conventional paper-based bedding (e.g., in the order of about 18% to about 25% greater absorbency); a uniform and consistently manufactured product; and an animal and fowl bedding product wherein the particle size and its composition improves longevity in the product. Further still, other advantages include reductions in the amount of foot sores and other ailments linked to wood based bedding; improved thermal qualities; faster decomposition when properly disposed of; and an animal and fowl bedding product that is substantially free from contamination, and one that can be custom manufactured to include performance enhancers (for example, scents, colors, among others). In addition, animal and fowl bedding product manufactured according to the processes and system described herein comes packaged for clean and dry storage and is acceptable for decomposition in fields or for biomass power generation.

CONCLUSION

Thus, what has been described is an efficient system and process by which previously unrecoverable waste products are turned into useful fiber products, such as cellulosic insulation, and animal and fowl bedding, among other products such as industrial fibers where fibers are used as thickeners, absorption agents or fillers and hydro-mulch, with a total ash content equal to or less than 10%.

The individual components shown in outline or designated by blocks in the attached Drawings are all well-known in the waste recycling arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Any U.S. and foreign patent document discussed above is hereby incorporated by reference into the detailed Description of the Presently Preferred Exemplary Embodiments.

What is claimed is:

1. A method for producing cellulosic fibers from mixed trash comprising:
   a. loading waste containing cellulosic fibers and other non-organic materials into a sorting apparatus to produce a combination of short and long fiber feedstock;
   b. blending the sorted trash to maintain a ratio of about 50% to about 90% short fiber feedstock and about 10% to about 50% long fiber feedstock;
   c. shredding the blended sorted fiber feedstock;
   d. weighing the shredded fiber feedstock into load sizes of about 100 to about 300 lbs;
   e. pulping the weighed fiber feedstock into cellulosic fibers and a first through fourth group of select waste materials with pulping fluids in a fiber extractor recovery apparatus thereby impregnating the cellulosic fibers with the pulping fluids;
   f. draining the cellulosic fibers from the extractor fiber recovery apparatus into a hydro-cleaner;
   g. de-watering the impregnated cellulosic fibers in the hydro-cleaner to reduce the amount of pulping fluid in the impregnated cellulosic fibers, and extracting a portion of the second group of select waste materials;
   h. depositing the extracted portion of the second group of select waste materials into a landfill;
   i. fluffing the de-watered cellulosic fibers in a first disk refiner;
   j. thickening the fluffed cellulosic fibers in a thickener and extracting pulping fluid for re-use in the fiber extractor recovery apparatus;
   k. storing the thickened cellulosic fibers in a stock chest apparatus;
   l. extracting pulping fluid from the thickened cellulosic fibers in a pulping fluid extractor;
   m. impregnating additional chemicals comprising fire retardant chemicals, dyes, insecticides, and/or biocides, such that the final cellulosic fiber product comprises a flame retardant loading of about 6%;
   n. extracting excess pulping fluid from the thickened cellulosic fibers in a pulp press thereby producing partially dried thickened cellulosic fibers;
   o. fluffing the partially dried thickened cellulosic fibers in a fluffer apparatus that reduces a density of the cellulosic fibers from a first range of about 6 to about 10 lbs per cubic foot to a second density range from about 2 to about 6 lbs per cubic foot, with a post fluffing moisture content of about 40% to about 60%;
   p. additionally fluffing the cellulosic fibers in a second disk refiner at a temperature between about 150° F. and about 700° F.;
   q. drying the cellulosic fibers in a dryer to further reduce the moisture content to about 10% to about 18%; and
   s. packaging or baling the dried cellulosic fibers.

2. The method according to claim 1, wherein the step of pulping comprises:
   i. rotating and agitating the shredded fiber feedstock in a plurality of fiber recovery apparatuses into cellulosic fibers and first through fourth groups of select waste materials, each of the fiber recovery apparatuses containing pulping fluid, wherein the pulping fluid comprises a combination of water, fire retardant chemicals, biocides, dyes, insecticides and surfactants;
   ii. impregnating the cellulosic fibers and the first through fourth select waste materials with fire resistant chemicals, dyes, chemical insecticides, and/or biocides;
   iii. separating the impregnated cellulosic fibers from the first group of select waste materials that are not utilized or desired in separator fiber recovery apparatuses;
   iv. extracting the first group of select waste materials dissolved within the pulping fluid from the cellulosic fibers in a dirty water tank, DAF contaminant separator, waste tank, and sludge press and then depositing the first group of select waste materials into a landfill;
   v. separating the impregnated cellulosic fibers from the second group of select waste materials in an extractor fiber recovery apparatus; and
   vi. extracting the second group of select waste materials from the impregnated cellulosic fibers.

3. The method according to claim 2, further comprising:
   t. transferring pulping fluid extracted from the pulping fluid extractor and pulp press to a dirty water storage chest to extract at least one additional inorganic compound selected from the group consisting of calcium carbonate, aluminum and magnesium hydroxide;
   u. adding one or more acids to the water and pulping fluid stored in the dirty water storage chest to lower the pH of the pulping fluid to a range of about 4.0 to about 5.0;
   v. mixing the pulping fluids in a first precipitator with one or more alkaline agents to increase the pH of the pulping fluid to a range of about 4.5 to about 6.0 to cause precipitation of aluminum and magnesium hydroxide byproducts;
   w. centrifuging the mixture of pulping fluids and precipitated aluminum and magnesium hydroxide byproducts in a first centrifuge to separate and discard the aluminum and magnesium hydroxide byproducts;
   x. adding carbon dioxide to the first centrifuged pulping fluids;
   y. mixing the pulping fluids in a second precipitator with one or more additional alkaline agents to increase the pH of the carbonated pulping fluids to a range of about 11.5 to about 12.8 or to a pH point wherein calcium carbonate precipitates from the carbonated pulping fluids;

z. centrifuging the mixture of carbonated pulping fluids and precipitated calcium carbonate byproducts in a second centrifuge to separate and discard the calcium carbonate byproducts, thereby producing treated white water for use in the recovery process; and aa. storing the treated white water in storage tanks for use in the recover process and apparatus.

4. The method according to claim 2, wherein the step of additionally fluffing the cellulosic fibers in a second disk refiner is omitted, and the step of drying includes drying the cellulosic fibers at a temperature between about 250° F. and 350° F., thereby producing animal and fowl bedding product.

* * * * *